United States Patent
Cho

(10) Patent No.: US 9,762,827 B2
(45) Date of Patent: Sep. 12, 2017

(54) METHOD OF REMOVING A BAD PIXEL FROM A PIXEL IMAGE GENERATED BY AN IMAGE SENSOR, AN IMAGE SENSOR USING THE METHOD, AND AN APPLICATION PROCESSOR USING THE METHOD

(71) Applicant: SAMSUNG ELECTRONICS CO., LTD., Suwon-si, Gyeonggi-Do (KR)

(72) Inventor: Young Sung Cho, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/887,664

(22) Filed: Oct. 20, 2015

(65) Prior Publication Data

US 2016/0142658 A1   May 19, 2016

(30) Foreign Application Priority Data

Nov. 17, 2014   (KR) .......................... 10-2014-0160322

(51) Int. Cl.
*H04N 5/367*   (2011.01)

(52) U.S. Cl.
CPC ................................ *H04N 5/3675* (2013.01)

(58) Field of Classification Search
CPC ...... H04N 5/3675; H04N 5/367; H04N 5/365; H04N 5/357
See application file for complete search history.

(56) References Cited

U.S. PATENT DOCUMENTS

| 6,900,836 | B2 * | 5/2005 | Hamilton, Jr. | ....... H04N 5/2176 348/241 |
| 6,985,180 | B2 * | 1/2006 | Chang | .................. H04N 5/2176 348/246 |
| 7,825,965 | B2 * | 11/2010 | Achong | ................. H04N 9/045 348/246 |
| 7,969,488 | B2 * | 6/2011 | Jerdev | .................... H04N 5/367 348/241 |
| 8,063,957 | B2 | 11/2011 | Goma et al. | |
| 8,154,632 | B2 * | 4/2012 | McKinnon | ........... H04N 5/3675 348/246 |
| 8,582,005 | B2 * | 11/2013 | Subbotin | ................ H04N 5/367 348/241 |
| 8,675,087 | B2 | 3/2014 | Oshima | |
| 8,817,135 | B2 * | 8/2014 | Jerdev | .................... H04N 5/367 348/241 |

(Continued)

FOREIGN PATENT DOCUMENTS

| JP | 2006-121293 | 5/2006 |
| JP | 2007-174124 | 7/2007 |

(Continued)

*Primary Examiner* — Nicholas Giles
(74) *Attorney, Agent, or Firm* — F. Chau & Associates, LLC

(57) ABSTRACT

A method of removing a bad pixel from a pixel image is provided. The method includes determining whether a representative pixel representing at least one bad pixel is included in a kernel, determining whether a first pixel is a bad pixel when the representative pixel is included in the kernel, and compensating for the first pixel using a second pixel in the kernel when the first pixel is determined to be a bad pixel. The kernel has the first pixel at a center of the kernel.

16 Claims, 8 Drawing Sheets

(56) References Cited

U.S. PATENT DOCUMENTS

| | | | | |
|---|---|---|---|---|
| 8,836,827 B2* | 9/2014 | Lee | H04N 5/367 |
| | | | 348/247 |
| 8,971,659 B2* | 3/2015 | Forutanpour | H04N 5/367 |
| | | | 348/241 |
| 9,077,873 B2* | 7/2015 | Bosco | H04N 5/2176 |
| 2001/0052938 A1* | 12/2001 | Itoh | H04N 5/3675 |
| | | | 348/246 |
| 2002/0158977 A1* | 10/2002 | Hamilton, Jr. | H04N 5/2176 |
| | | | 348/246 |
| 2002/0196354 A1* | 12/2002 | Chang | H04N 5/2176 |
| | | | 348/246 |
| 2004/0239782 A1* | 12/2004 | Equitz | H04N 5/335 |
| | | | 348/246 |
| 2006/0044425 A1* | 3/2006 | Yeung | H04N 5/367 |
| | | | 348/246 |
| 2007/0030365 A1* | 2/2007 | Jerdev | H04N 5/367 |
| | | | 348/241 |
| 2008/0049125 A1* | 2/2008 | Subbotin | H04N 5/367 |
| | | | 348/241 |
| 2010/0034481 A1 | 2/2010 | Forutanpour | |
| 2011/0043668 A1* | 2/2011 | McKinnon | H04N 5/3675 |
| | | | 348/246 |
| 2011/0193998 A1* | 8/2011 | Subbotin | H04N 5/3675 |
| | | | 348/247 |
| 2011/0221939 A1* | 9/2011 | Jerdev | H04N 5/367 |
| | | | 348/246 |
| 2012/0133804 A1* | 5/2012 | Kim | H04N 5/3675 |
| | | | 348/246 |
| 2013/0002911 A1* | 1/2013 | Miyashita | H04N 5/23212 |
| | | | 348/247 |
| 2013/0162871 A1* | 6/2013 | Bosco | H04N 5/2176 |
| | | | 348/246 |
| 2013/0335602 A1* | 12/2013 | Lee | H04N 5/367 |
| | | | 348/247 |
| 2014/0192236 A1 | 7/2014 | Kolli | |

FOREIGN PATENT DOCUMENTS

| | | |
|---|---|---|
| JP | 2009-130553 | 6/2009 |
| JP | 2010-010760 | 1/2010 |
| JP | 2010-130238 | 6/2010 |
| JP | 2010-212788 | 9/2010 |
| JP | 2011-114473 | 6/2011 |
| KR | 1020020042001 | 6/2002 |
| KR | 1020090081653 | 7/2009 |

* cited by examiner

METHOD OF REMOVING A BAD PIXEL FROM A PIXEL IMAGE GENERATED BY AN IMAGE SENSOR, AN IMAGE SENSOR USING THE METHOD, AND AN APPLICATION PROCESSOR USING THE METHOD

CROSS-REFERENCE TO RELATED APPLICATIONS

This application claims priority under 35 U.S.C. §119(a) to Korean Patent Application No. 10-2014-0160322, filed on Nov. 17, 2014, in the Korean Intellectual Property Office, the disclosure of which is incorporated by reference herein in its entirety.

TECHNICAL FIELD

Embodiments of the present inventive concept relate to a method of removing a bad pixel from a pixel image detected by an image sensor, and more particularly, to an image sensor using the method and an application processor using the method.

DISCUSSION OF THE RELATED ART

A pixel array of an image sensor may include a plurality of pixels which converts an image picked up from an object into electrical signals. The plurality of pixels may include bad pixels that do not function properly.

Post image processing to identify and compensate bad pixels would enhance quality and performance.

SUMMARY

According to an embodiment of the present inventive concept, a method of removing a bad pixel from a pixel image is provided. The method includes determining whether a representative pixel representing at least one bad pixel is included in a kernel, determining whether a first pixel is a bad pixel when the representative pixel is included in the kernel, and compensating for the first pixel using a second pixel in the kernel when the first pixel is determined to be a bad pixel. The kernel has the first pixel at a center of the kernel.

The method may further include adjusting a first pixel range of the kernel when the representative pixel is included in the kernel.

The determining whether the representative pixel is included in the kernel may include comparing coordinates of the first pixel with coordinates of the representative pixel, calculating a horizontal offset and a vertical offset based on the comparison result, and determining whether the horizontal offset and the vertical offset are within a predetermined value corresponding to a size of the kernel. The horizontal offset may be a distance in a first direction between the first pixel and the representative pixel. The vertical offset may be a distance in a second direction perpendicular to the first direction between the first pixel and the representative pixel.

The method may further include storing information about the representative pixel.

The information about the representative pixel may include coordinates of the representative pixel or the number of bad pixels adjacent to the representative pixel.

A size of the kernel may be one of 2×2, 3×3, 5×5 and 7×7.

According to an embodiment of the present inventive concept, an image sensor is provided. The image sensor includes an image generating unit and a bad pixel processing unit. The image generating unit is configured to generate a pixel image corresponding to intensity of incident light. The bad pixel processing unit is configured to detect a bad pixel, and to output a compensated pixel image. The bad pixel processing unit includes a bad pixel detection unit and a bad pixel compensation unit. The bad pixel detection unit is configured to determine whether a representative pixel representing at least one bad pixel is included in a kernel, and to determine whether a first pixel is a bad pixel when the representative pixel is included in the kernel. The bad pixel compensation unit is configured to compensate for the first pixel using a second pixel in the kernel when the first pixel is determined to be a bad pixel, and to output the compensated pixel image. The kernel has the first pixel at a center of the kernel.

The bad pixel detection unit may adjust a first pixel range of the kernel when the representative pixel is included in the kernel.

The bad pixel detection unit may compare coordinates of the first pixel with coordinates of the representative pixel, calculate a horizontal offset and a vertical offset based on the comparison result, and determine whether the horizontal offset and the vertical offset are within a predetermined value corresponding to a size of the kernel. The horizontal offset may be a distance in a first direction between the first pixel and the representative pixel. The vertical offset may be a distance in a second direction perpendicular to the first direction between the first pixel and the representative pixel.

The bad pixel processing unit may further include a bad pixel memory configured to store information about the representative pixel.

The information about the representative pixel may include coordinates of the representative pixel or the number of bad pixels adjacent to the representative pixel.

A size of the kernel may be one of 2×2, 3×3, 5×5 and 7×7.

The bad pixel detection unit may output the first pixel as the compensated pixel image without performing the bad pixel compensation when the representative pixel is not included in the kernel.

The image generating unit may include a pixel array, a readout block, and a control unit. The pixel array may include a plurality of pixels each configured to generate an electrical signal varying depending on the intensity of the incident light. The readout block may be configured to convert the electrical signal into the pixel image in a digital format. The control unit may be configured to control the pixel array and the readout block.

According to an embodiment of the present inventive concept, an application processor is provided. The application processor includes a camera interface and an image signal processor. The camera interface is configured to receive a pixel image. The image signal processor is configured to process the pixel image to generate image data. The image signal processor includes a bad pixel detection unit and a bad pixel compensation unit. The bad pixel detection unit is configured to determine whether a representative pixel representing at least one bad pixel is included in a kernel, and to determine whether a first pixel is a bad pixel when the representative pixel is included in the kernel. The bad pixel compensation unit is configured to compensate for the first pixel using a second pixel in the kernel when the first pixel is determined to be a bad pixel. The kernel has the first pixel at a center of the kernel.

The bad pixel detection unit may adjust a first pixel range of the kernel when the representative pixel is included in the kernel.

The bad pixel detection unit may compare coordinates of the first pixel with coordinates of the representative pixel, calculate a horizontal offset and a vertical offset based on the comparison result, and determine whether the horizontal offset and the vertical offset are within a predetermined value corresponding to a size of the kernel. The horizontal offset may be a distance in a first direction between the first pixel and the representative pixel. The vertical offset may be a distance in a second direction perpendicular to the first direction between the first pixel and the representative pixel.

The image signal processor may further include a bad pixel memory configured to store information about the representative pixel.

The information about the representative pixel may include coordinates of the representative pixel or the number of bad pixels adjacent to the representative pixel.

A size of the kernel may be one of 2×2, 3×3, 5×5 and 7×7.

The bad pixel detection unit may output the first pixel as a compensated pixel image without performing the bad pixel compensation when the representative pixel is not included in the kernel.

According to an embodiment of the present inventive concept, a method of processing a bad pixel included in a pixel image is provided. The method includes detecting a bad pixel using coordinates of a representative pixel representing at least one bad pixel and compensating for a first pixel using a second pixel in a kernel when the first pixel is a bad pixel. The kernel has the first pixel at a center of the kernel. The detecting a bad pixel includes determining whether the representative pixel is included in the kernel, determining whether the first pixel is a bad pixel when the representative pixel is included in the kernel, and determining the first pixel as a bad pixel when luminance value of the first pixel is not within a first pixel range. The first pixel range is determined based on average luminance of the kernel.

The detecting the bad pixel may further include decreasing the first pixel range of the kernel when the representative pixel is included in the kernel.

The detecting the bad pixel may further include outputting the first pixel as a compensated pixel image when the representative pixel is not included in the kernel.

The detecting the bad pixel may further include outputting the first pixel as a compensated pixel image when the luminance value of the first pixel is within the first pixel range in the kernel.

The second pixel may surround the first pixel in the kernel and have a substantially same color as the first pixel.

BRIEF DESCRIPTION OF THE DRAWINGS

The above and other features of the present inventive concept will become more apparent by describing in detail exemplary embodiments thereof with reference to the attached drawings in which.

DETAILED DESCRIPTION OF THE EMBODIMENTS

Figure 1:
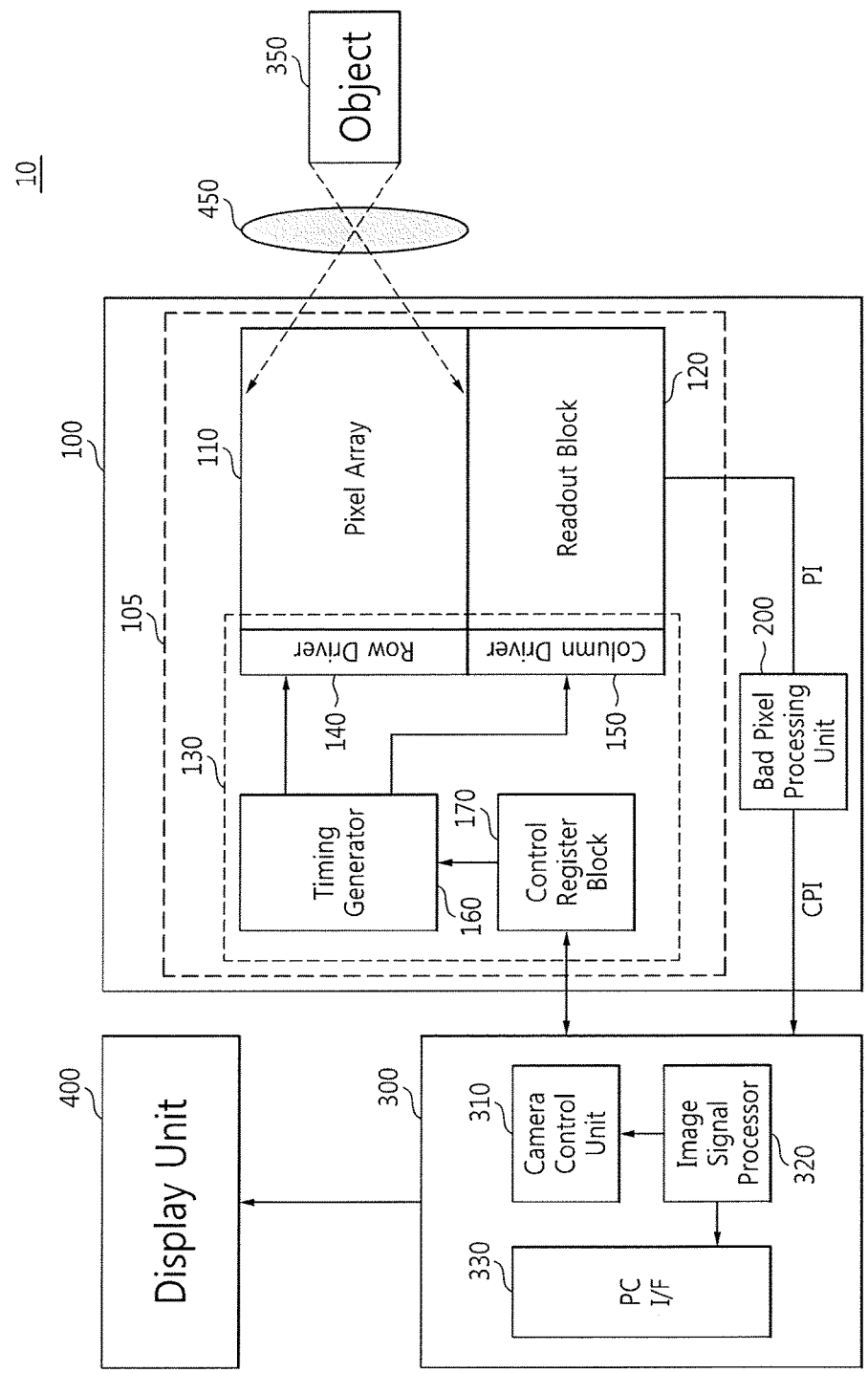
FIG. 1 is a block diagram of an image processing system including an image sensor according to an embodiment of the present inventive concept.

The present inventive concept now will be described more fully hereinafter with reference to the accompanying drawings, in which embodiments of the present inventive concept are shown. The present inventive concept may, however, be embodied in many different forms without departing from the spirit and scope of the present inventive concept and should not be construed as limited to the embodiments set forth herein. In the drawings, the size and relative sizes of layers and regions may be exaggerated for clarity. Like numbers may refer to like elements throughout the specification and drawings.

As used herein, the term "and/or" includes any and all combinations of one or more of the associated listed items and may be abbreviated as "/".

As used herein, the singular forms "a", "an" and "the" are intended to include the plural forms as well, unless the context clearly indicates otherwise.

FIG. 1 is a block diagram of an image processing system 10 including an image sensor 100 according to an embodiment of the present inventive concept. The image processing system 10 may include the image sensor 100, a digital signal processor (DSP) 300, a display unit 400, and a lens 450. The image sensor 100 may include an image generating unit 105 and a bad pixel processing unit 200.

The image generating unit 105 may generate a pixel image PI corresponding to the intensity of light coming through the lens 450. The image generating unit 105 may include a pixel array 110, a readout block 120, and a control unit 130.

The pixel array 110 may include a plurality of pixels each of which accumulates photocharges generated in response to light coming from an object 350 through the lens 450 and generates a pixel signal corresponding to the photocharges. The pixels may be arranged in a matrix of "n" rows and "m" columns, where "n" and "m" are integers of at least 1.

Each of the pixels includes a plurality of transistors and a plurality of photoelectric conversion elements. Each of the photoelectric conversion elements may be a photo diode, a pinned photo diode, or the like. The pixel array 110 senses light using the plurality of photoelectric conversion elements and converts the light into electrical signals, and thus, the pixel signals are generated. The pixels may be referred to as image pixels in the sense that the pixels generate a signal corresponding to a captured image.

The readout block 120 may remove noise (e.g., reset noise) from a pixel signal which is generated by each of the pixels and may perform analog-to-digital conversion on the pixel signal from which the noise is removed. The readout block 120 may temporarily store the pixel image PI, which corresponds to the pixel signal in a digital format after being converted, may amplify the pixel image PI, and may output the amplified pixel image PI. The readout block 120 may include an analog-to-digital converter (ADC) which removes the noise and performs the analog-to-digital conversion, a memory (e.g., static random access memory (SRAM)) which temporarily stores the pixel image PI, and a buffer which amplifies and outputs the pixel image PI.

The control unit 130 may generate a plurality of control signals for controlling the operations of the pixel array 110 and the readout block 120. The control unit 130 may include a row driver 140, a column driver 150, a timing generator 160, and a control register block 170.

The row driver 140 drives the pixel array 110 by a unit of row. For example, pixels in one row may be provided with the same control signal. The row driver 140 may decode a control signal output from the timing generator 160 and provide control signals for the pixel array 110.

The column driver 150 may generate a plurality of control signals according to the control of the timing generator 160 to control the operation of the readout block 120. The timing generator 160 may apply a control signal to the row driver 140 and the column driver 150 to control the operations or timing of the row driver 140 and the column driver 150. The timing generator 160 may generate the control signal or a clock signal to be applied to the row driver 140 and the column driver 150 using a control signal and a clock signal received from an external device (e.g., a host).

The control register block 170 operates according to the control of a camera control unit 310 and may store or buffer the control signal and the clock signal. In addition, the control register block 170 may control the image generating unit 105 and the bad pixel processing unit 200 of the image sensor 100.

The bad pixel processing unit 200 may receive the pixel image PI, detect bad pixels from pixels of the pixel image PI, compensate for the bad pixels, and output a compensated pixel image CPI. The pixel image PI may be a stream signal in which digital values of respective pixels in the pixel array 110 are sequentially arranged. For example, when the pixel array 110 includes pixels arranged in a matrix of ten rows and ten columns, the pixel image PI may be a stream signal in which a total of 100 digital values are sequentially arranged from a digital value corresponding to a pixel signal output from a pixel in the first row and the first column to a digital value corresponding to a pixel signal output from a pixel in the tenth row and the tenth column.

A bad pixel is a pixel of the pixel image PI which outputs a different signal than a picked-up image. A pixel may be bad due to, e.g., a failure in a transistor within the corresponding pixel.

The bad pixel processing unit 200 sequentially receives the pixels of the pixel image PI, recognizes each of the pixels as a target pixel, detects a bad pixel, and compensates for the detected bad pixel. The operation of the bad pixel processing unit 200 will be described in detail with reference to FIGS. 3 through 7 later.

The DSP 300 may generate image data by processing the compensated pixel image CPI output from the image sensor 100 and may output the image data to the display unit 400. The DSP 300 may include the camera control unit 310, an image signal processor (ISP) 320, and a personal computer interface (PC I/F) 330.

The camera control unit 310 controls the control register block 170. The camera control unit 310 may control the control register block 170 using an inter-integrated circuit (I²C), but the scope of the present inventive concept is not restricted thereto.

The ISP 320 processes the compensated pixel image CPI output from the image sensor 100 into image data and outputs the image data to the display unit 400 through the PC I/F 330. The ISP 320 is implemented in a chip separated from the image sensor 100. In an exemplary embodiment of the present inventive concept, the ISP 320 and the image sensor 100 may be integrated into a single chip.

Figure 2:
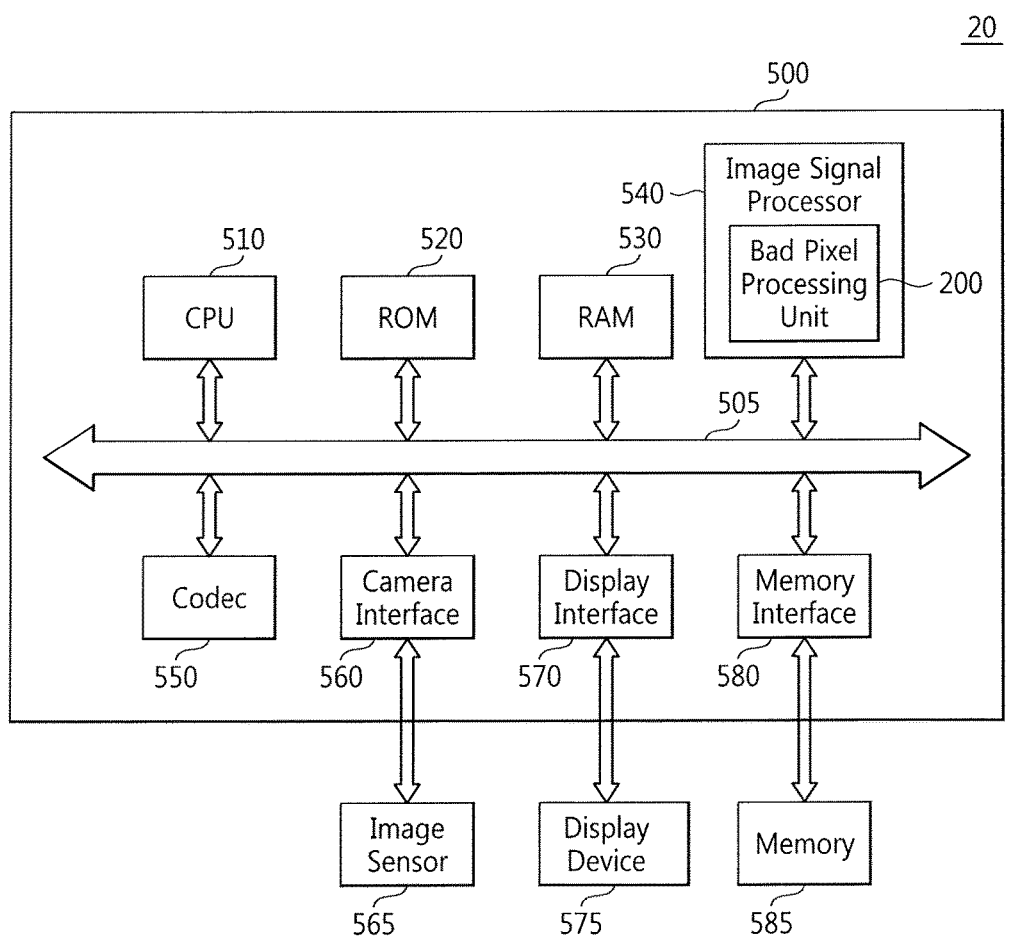
FIG. 2 is a block diagram of a data processing system according to an embodiment of the present inventive concept.

The display unit 400 may be any device that can output an image using image data output from the DSP 300. For example, the display unit 400 may be implemented as a computer, a mobile phone, a smart phone, any type of image output terminal, or the like FIG. 2 is a block diagram of a data processing system 20 according to an embodiment of the present inventive concept. Referring to FIGS. 1 and 2, the data processing system 20 may be implemented as a mobile terminal such as a smart phone, a tablet personal computer (PC), a personal digital assistant (PDA), an enterprise digital assistant (EDA), a mobile internet device (MID), an e-book, or the like.

The data processing system 20 may include an application processor 500, an image sensor 565, a display device 575, and a memory 585. The image sensor 565 may include the same components as the image sensor 100 illustrated in FIG. 1 except for the bad pixel processing unit 200.

The application processor 500 may include a central processing unit (CPU) 510, read only memory (ROM) 520, random access memory (RAM) 530, an ISP 540, a codec 550, a camera interface 560, a display interface 570, and a memory interface 580. The application processor 500 may be implemented as a system on chip (SoC). The components 510, 520, 530, 540, 550, 560, 570, and 580 of the application processor 500 may communicate data with one another via a bus 505.

The CPU 510 may control the overall operation of the application processor 500. The CPU 510 may process or execute programs and/or data stored in the ROM 520 and/or the RAM 530. The CPU 510 may be implemented as a multi-core processor, e.g., a single computing component with two or more independent processors (or cores).

The ROM 520 may store programs and/or data which are continuously used. The ROM 520 may be formed with erasable programmable ROM (EPROM), electrically erasable programmable ROM (EEPROM), or the like.

The RAM 530 may temporarily store programs, data, and/or instructions (e.g., commands). The RAM 530 may be formed with dynamic RAM (DRAM), SRAM, or the like. The RAM 530 may temporarily store data which is input and/or output through the interfaces 560, 570, and 580, or data which is generated by the codec 550, the CPU 510, or the like.

The ISP 540 may perform image processing on data received from the RAM 530, the camera interface 560, the memory interface 580, or the like, and may output processed image data to the RAM 530, the display interface 570, the memory interface 580, or the like. The ISP 540 may be formed in software, hardware, a combination thereof, or the like.

The ISP 540 may be the ISP 320 illustrated in FIG. 1 or may further include the bad pixel processing unit 200 of FIG. 1, as illustrated in FIG. 2. For example, the bad pixel processing unit 200 is included in the image sensor 100 as illustrated in FIG. 1, but the bad pixel processing unit 200 may be included in the ISP 540 outside the image sensor 565 as illustrated in FIG. 2.

The codec 550 may encode or decode data received from the image sensor 565 or the encoded or decoded data output to the display device 575. The codec 550 may include an encoder and a decoder.

The camera interface 560 may interface data (e.g., the pixel image PI) which is input from the image sensor 565 in the outside of the application processor 500. The display interface 570 may interface data (e.g., image data) which is output to the display device 575 in the outside of the application processor 500. The display device 575 may output an image or data about an image through a display such as a liquid crystal display (LCD), an active matrix organic light emitting diode (AMOLED) display, or the like.

The memory interface 580 may interface data which is input from the memory 585 in the outside of the application processor 500 or data which is output to the memory 585. The memory 585 may be formed with non-volatile memory such as flash memory, resistive memory, or the like.

Figure 3:
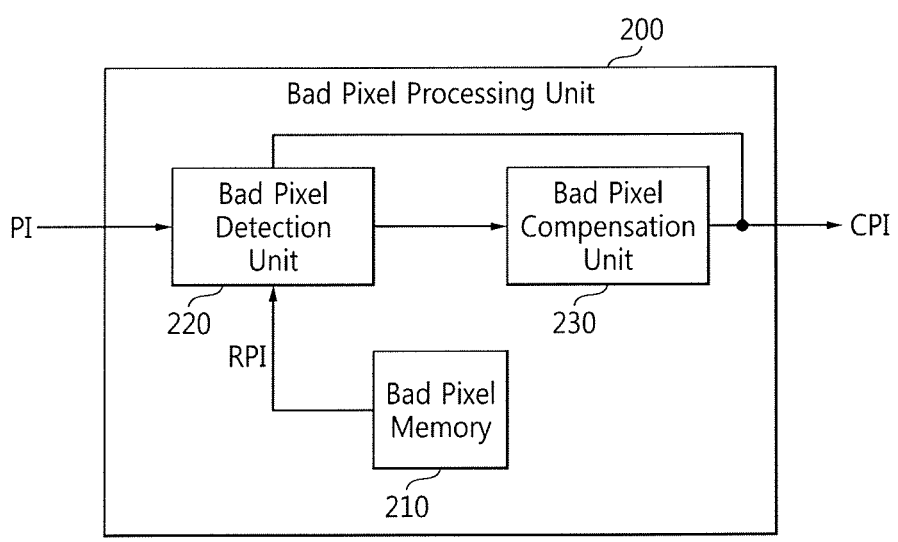
FIG. 3 is a block diagram of a bad pixel processing unit illustrated in FIGS. 1 and 2 according to an embodiment of the present inventive concept.

FIG. 3 is a block diagram of the bad pixel processing unit 200 illustrated in FIGS. 1 and 2 according to an embodiment of the present inventive concept. Referring to FIGS. 1 through 3, the bad pixel processing unit 200 may include a bad pixel memory 210, a bad pixel detection unit 220, and a bad pixel compensation unit 230. The bad pixel processing unit 200 may be formed in software, hardware, a combination thereof, or the like.

The bad pixel memory 210 may store representative pixel information RPI about a representative pixel. The bad pixel memory 210 may be formed with non-volatile memory, e.g., ROM such as EPROM, EEPROM, or the like, flash memory, or resistive memory.

A representative pixel is a pixel that is either a bad pixel or a pixel adjacent to one or more bad pixels. The representative pixel may be positioned at the same location as a bad pixel (e.g., a first bad pixel) or may be positioned at substantially the center of more than one bad pixels; however the present inventive concept is not restricted thereto. The representative pixel information RPI may include the coordinates of the representative pixel and information about the number of bad pixels adjacent to the representative pixel.

The terms "kernel" and "center pixel", which will be mentioned hereinafter, will be explained first. The kernel is a group of pixels which are subjected to bad pixel detection and bad pixel compensation at a time, and the kernel may have a size of a×b (where "a" is the number of pixels in a row, "b" is the number of pixels in a column, and "a" and "b" are integers of at least 1), e.g., 2×2, 3×3, 5×5, 7×7, or the like. The center pixel is a pixel positioned at the center of the kernel. For example, in a 2×2 kernel, the center pixel may be a pixel at the top-left position thereof, but not limited thereto, and in a 5×5 kernel, the center pixel may be a pixel at the intersection of the third row and the third column thereof.

The bad pixel detection unit 220 may determine whether a target pixel is a bad pixel and whether the representative pixel is included in a kernel in which the target pixel is a center pixel. A target pixel may be any pixel in the pixel image. In the case of a streaming pixel image, a first pixel is handled as a target pixel, and a second pixel next to the first pixel (e.g., in a raster direction illustrated in FIG. 4) in the pixel image PI is handled as the next target pixel.

Figure 4:
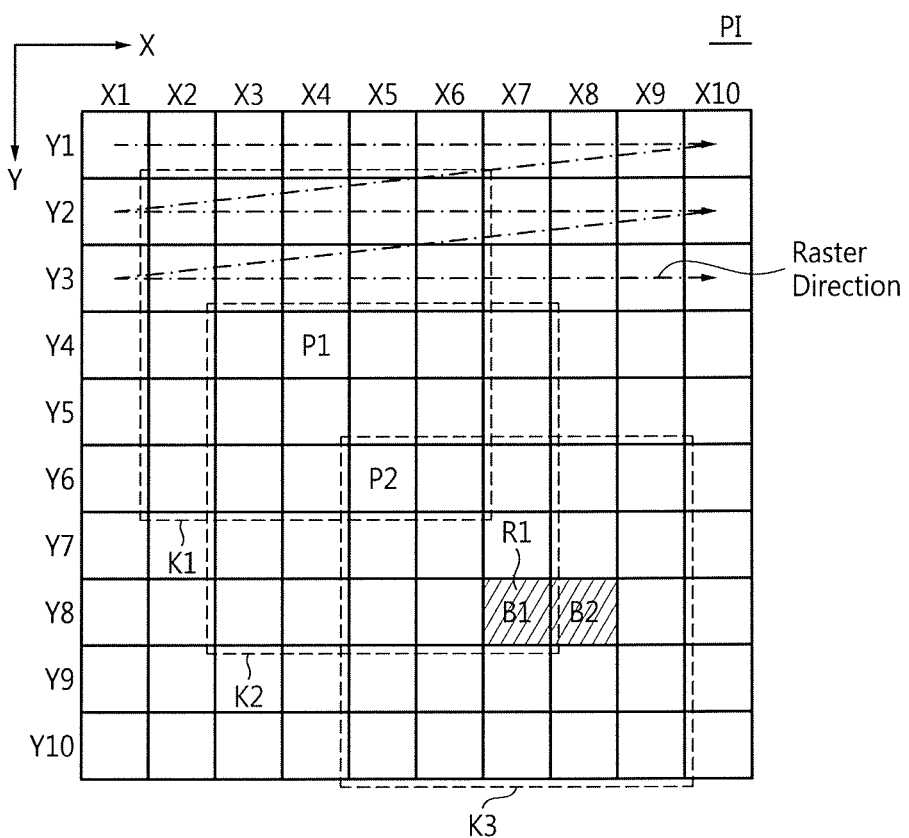
FIG. 4 is a diagram of a pixel image input to the bad pixel processing unit illustrated in FIG. 3 according to an embodiment of the present inventive concept.

The bad pixel detection unit 220 may determine a target pixel and a kernel in which the target pixel is a center pixel. For example, when a pixel P1 illustrated in FIG. 4 is determined as a target pixel, a first kernel K1 having the pixel P1 as a center pixel may be selected to perform the bad pixel processing.

The bad pixel detection unit 220 may compare the coordinates of a target pixel (or the coordinates of the determined kernel) with the coordinates of a representative pixel included in the representative pixel information RPI and may determine whether the representative pixel is included in the kernel. For example, the bad pixel detection unit 220 may compare the coordinates of a target pixel with the coordinates of a representative pixel, calculate a horizontal offset (e.g., a difference between X-coordinates of the target pixel and the representative pixel) and a vertical offset (e.g., a difference between Y-coordinates of the target pixel and the representative pixel), and determine whether absolute values of the horizontal offset and the vertical offset are equal to or smaller than a predetermined value corresponding to a size of the kernel to determine whether the representative pixel is included in the kernel. For example, the predetermined value may be n/2 when the size of the kernel is n×n (where n is an integer at least 1).

For example, when a size of the kernel is 5×5 and horizontal and vertical offsets between the coordinates of a target pixel and the coordinates of a representative pixel are +1 and −2, respectively, the representative pixel may be determined to be included in the kernel. When the horizontal and vertical offsets between the coordinates of the target pixel and the coordinates of the representative pixel are +4 and −2, respectively, the representative pixel may be determined to be not included in the kernel.

When the representative pixel is not included in the kernel, the bad pixel detection unit 220 may output the target pixel as the compensated pixel image CPI. When the representative pixel is included in the kernel, the bad pixel detection unit 220 may determine whether the target pixel is a bad pixel. The bad pixel detection unit 220 may determine whether a value of the target pixel is within a predetermined normal pixel range NPR to determine whether the target pixel is a bad pixel or not, but the present inventive concept is not restricted to the embodiment. For example, the value of the target pixel may be luminance of the target pixel and the normal pixel range NPR may be determined based on average luminance of a kernel having the target pixel as a center pixel. The higher the average luminance, the higher the median level (e.g., a median value between a maximum level and a minimum level) of the normal pixel range NPR and the larger the size (e.g., a difference between the maximum level and the minimum level) of the normal pixel range NPR.

When the representative pixel is included in the kernel or when the number of bad pixels adjacent to the representative pixel is greater than a predetermined number (e.g., 2), the bad pixel detection unit 220 may adjust the normal pixel range NPR of the kernel, for example, the bad pixel detection unit 220 may decrease the normal pixel range NPR of the kernel.

When the target pixel is not in the normal pixel range NPR, the bad pixel detection unit 220 may consider the target pixel as a bad pixel and may transmit the target pixel to the bad pixel compensation unit 230. When the target pixel is within the normal pixel range NPR, the bad pixel detection unit 220 may consider the target pixel as not a bad pixel and may output the target pixel as the compensated pixel image CPI.

The bad pixel compensation unit 230 may perform compensation on the target pixel received from the bad pixel detection unit 220. The bad pixel compensation unit 230 may compensate for the target pixel using surrounding pixels of the target pixel in the kernel having the target pixel as the center pixel. The compensation may be performed by using an average value of pixels having the same color (e.g., a red, blue, or green color) as the target pixel among the surrounding pixels or by filtering the surrounding pixels, but the present inventive concept is not restricted to the embodiment. The bad pixel compensation unit 230 may output a compensated target pixel as the compensated pixel image CPI.

Figure 5:
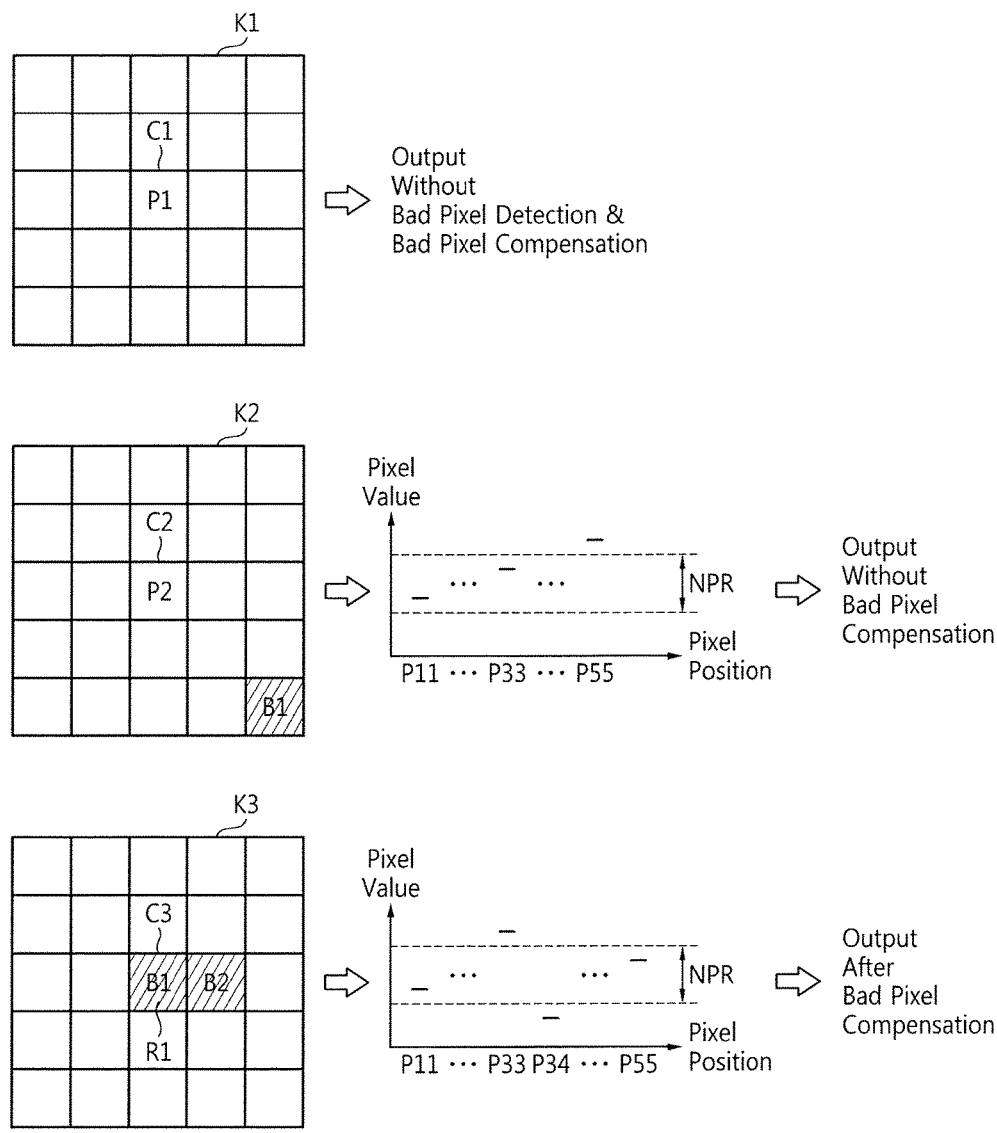
FIG. 5 is a diagram for explaining an operation of a bad pixel detection unit illustrated in FIG. 3 according to an embodiment of the present inventive concept.
Figure 6:
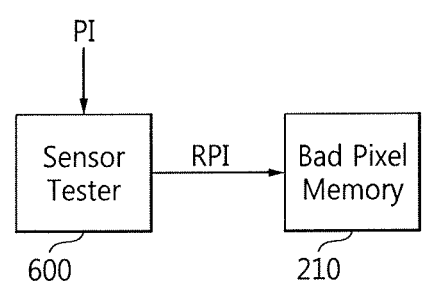
FIG. 6 is a diagram for explaining a procedure for generating representative pixel information stored in a bad pixel memory illustrated in FIG. 3 according to an embodiment of the present inventive concept.
Figure 7:
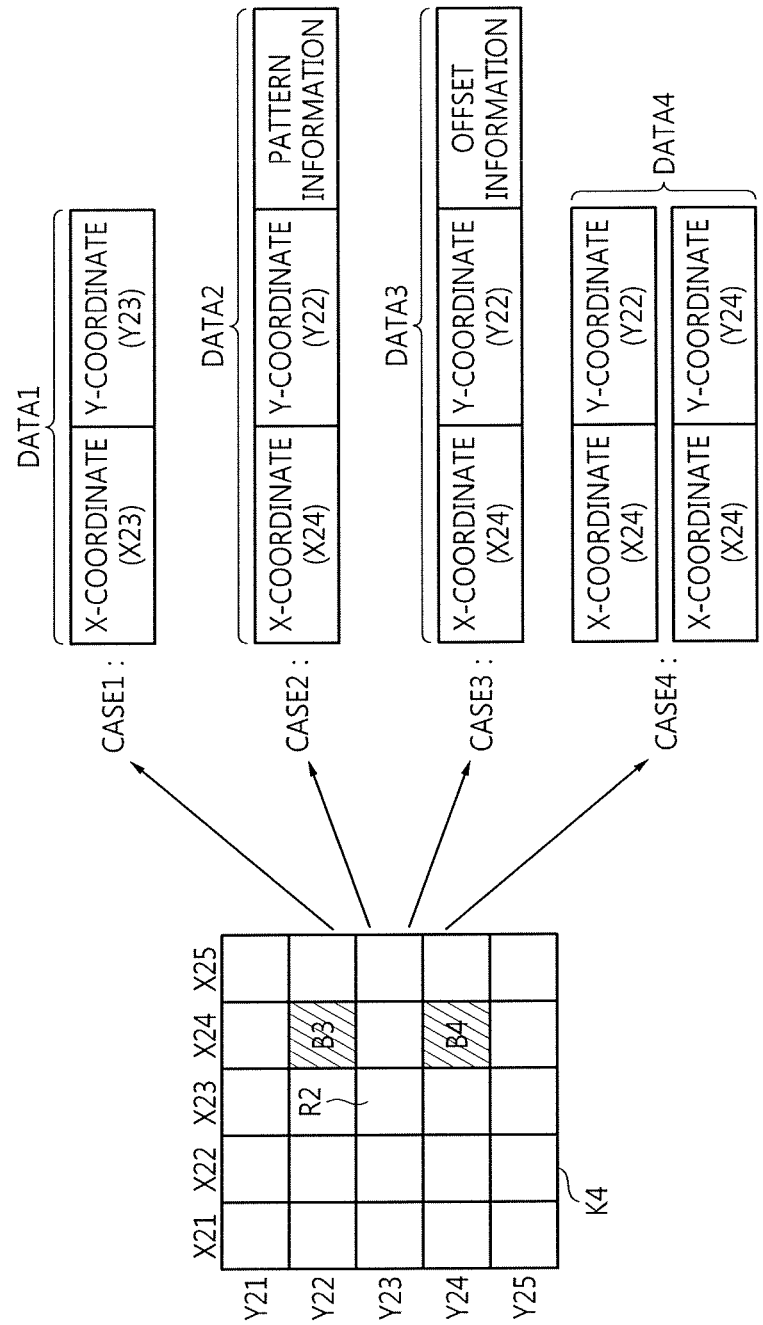
FIG. 7 is a diagram for comparing data stored in a bad pixel memory illustrated in FIG. 3 case by case according to an embodiment of the present inventive concept.

FIG. 4 is a diagram of a pixel image PI input to the bad pixel processing unit 200 illustrated in FIG. 3 according to an embodiment of the present inventive concept. FIG. 5 is a diagram for explaining an operation of the bad pixel detection unit 220 illustrated in FIG. 3 according to an embodiment of the present inventive concept. FIG. 6 is a diagram for explaining a procedure for generating representative pixel information RPI stored in a bad pixel memory 210 illustrated in FIG. 3 according to an embodiment of the present inventive concept. FIG. 7 is a diagram for comparing data stored in a bad pixel memory 210 illustrated in FIG. 3 case by case according to an embodiment of the present inventive concept.

Referring to FIGS. 1 through 7, FIG. 4 shows an example of the pixel image PI. For purpose of illustration, the pixel array 110 includes pixels arranged in a matrix of 10 rows and 10 columns, the pixel image PI is formed in a matrix of 10 rows and 10 columns, and each pixel of the pixel image PI is defined by an X-coordinate (e.g., one of X1 through X10) and a Y-coordinate (e.g., one of Y1 through Y10). For example, the coordinate of the pixel P1 is (X4, Y4). Here, the numbers of rows and columns in the matrix are just examples and the present inventive concept is not restricted to these examples.

The bad pixel detection unit 220 may receive pixels sequentially from a pixel at coordinate (X1, Y1) to a pixel at coordinate (X10, Y1) in the first row and from a pixel at coordinate (X1, Y2) to a pixel at coordinate (X10, Y2) in the second row. For example, the bad pixel detection unit 220 may consider, as a target pixel, each of the pixels sequentially input in the raster direction from the first row to the tenth row and may perform the bad pixel detection on each target pixel sequentially.

Referring to FIG. 4, a first kernel K1 has the pixel P1 as a target pixel which is a center pixel of the first kernel K1, a second kernel K2 has a pixel P2 as a target pixel which is a center pixel of the second kernel K2, and a third kernel K3 has a representative pixel R1 as a target pixel which is a center pixel of the third kernel K3. It is assumed that there are two bad pixels B1 and B2 in the pixel image PI.

Referring to FIG. 5, the first kernel K1 has the pixel P1 as a target pixel and a center pixel C1 of the first kernel K1. When the bad pixel detection unit 220 determines the pixel P1 as the target pixel, the bad pixel detection unit 220 determines whether the representative pixel R1 is included in the first kernel K1. Since the representative pixel R1 is not included in the first kernel K1, the bad pixel detection unit 220 may output the target pixel, e.g., the bad pixel detection unit 220 may output the pixel P1 as the compensated pixel image CPI without performing the bad pixel detection and the bad pixel compensation. Here, the bad pixel detection is an operation of determining whether the target pixel is a bad pixel, and the bad pixel compensation is an operation of compensating for the target pixel determined as a bad pixel.

The second kernel K2 has the pixel P2 as a target pixel and a center pixel C2 of the second kernel K2. When the bad pixel detection unit 220 determines the pixel P2 as the target pixel, the bad pixel detection unit 220 determines whether the representative pixel R1 is included in the second kernel K2. Since the representative pixel R1 is included in the second kernel K2, the bad pixel detection unit 220 performs the bad pixel detection.

The bad pixel detection unit 220 determines a normal pixel range NPR from pixel values corresponding to pixel positions P11 through P55 (where PAB denotes a position of an intersection of an A-th row and a B-th column) in the second kernel K2 and determines whether a pixel value corresponding to the position P33 of the target pixel P2 is within the normal pixel range NPR. Since the pixel value corresponding to the position P33 is within the normal pixel range NPR, the bad pixel detection unit 220 may not transmit the target pixel P2 to the bad pixel compensation unit 230 for the bad pixel compensation and may output the target pixel P2 as the compensated pixel image CPI.

When the representative pixel R1 is included in the second kernel K2 or when the number of bad pixels adjacent to the representative pixel R1 is greater than a predetermined number (e.g., 2), the bad pixel detection unit 220 may adjust the normal pixel range NPR, for example, the bad pixel detection unit 220 may decrease the normal pixel NPR of the second kernel K2. When the representative pixel R1 is included in the second kernel K2 or when the number of bad pixels adjacent to the representative pixel R1 is greater than a predetermined number (e.g., 2), it may be understood to mean that a possibility such that bad pixels are included in the second kernel K2 is relatively high. The smaller the normal pixel range NPR, the more finely the bad pixel detection can be performed. Therefore, the bad pixel detection unit 220 may adjust (e.g., decrease) the normal pixel range NPR, and thus, whether the target pixel P2 is a bad pixel or not may be more precisely determined.

The third kernel K3 has the representative pixel R1 as a target pixel and a center pixel C3 of the third kernel K3. When the bad pixel detection unit 220 determines the representative pixel R1 as the target pixel, the bad pixel detection unit 220 determines whether the representative pixel R1 is included in the third kernel K3. Since the representative pixel R1 is included in the third kernel K3, the bad pixel detection unit 220 performs the bad pixel detection.

The bad pixel detection unit 220 determines the normal pixel range NPR from pixel values corresponding to pixel positions P11 through P55 in the third kernel K3 and determines whether a pixel value corresponding to the position P33 of the target pixel R1 is within the normal pixel range NPR. Since the pixel value corresponding to the position P33 is out of the normal pixel range NPR, the bad pixel detection unit 220 may transmit the target pixel R1 to the bad pixel compensation unit 230 for the bad pixel compensation.

When the representative pixel R1 is included in the third kernel K3 or when the number of bad pixels adjacent to the representative pixel R1 is greater than a predetermined number (e.g., 2), the bad pixel detection unit 220 may adjust (e.g., decrease) the normal pixel range NPR.

Referring to FIG. 6, the sensor tester 600 generates the representative pixel information RPI. The sensor tester 600 may be implemented as an electrical die sorting (EDS) tester, but the present inventive concept is not restricted to the embodiment.

The sensor tester 600 may analyze the pixel image PI generated in the image sensor 100 or 565 under various conditions such as a white level (e.g., a high level of illuminance), a black level (e.g., a low level of illuminance), or the like, and may detect pixels at particular positions as bad pixels. The sensor tester 600 may determine a representative pixel based on a position of each of the pixels detected as bad pixels.

The representative pixel is a pixel that represents adjacent bad pixels. Here, when a plurality of bad pixels is included in a particular kernel (e.g., a kernel used by the bad pixel processing unit 200), the plurality of bad pixels included in the kernel may be construed as adjacent bad pixels.

The representative pixel is a pixel whose horizontal and vertical offsets from each of the adjacent bad pixels are equal to or smaller in absolute value than a predetermined value corresponding to a size of the kernel. For example, the predetermined value may be n/2 when the size of the kernel is n×n. For example, when a bad pixel is positioned as shown in FIG. 4, one of pixels within a particular X-coordinate range of X6 to X9 and a particular Y-coordinate range of Y6 to Y10 may be determined as the representative pixel.

The sensor tester 600 may generate the representative pixel information RPI including the coordinate of the representative pixel and information about the number of bad pixels adjacent to the representative pixel, and may store the representative pixel information RPI in the bad pixel memory 210. The information about the number of bad pixels adjacent to the representative pixel may not be included in the representative pixel information RPI.

Referring to FIG. 7, it is assumed that a fourth kernel K4 includes two bad pixels B3 and B4 within a particular X-coordinate range of X21 to X25 and a particular Y-coordinate range of Y21 to Y25 and a pixel at a position (X23, Y23) is determined as a representative pixel R2. The size of data stored in the bad pixel memory 210 may be different among cases CASE1 through CASE4. For example, each of the X- and Y-coordinates of a pixel is composed of 13 bits, pattern information is composed of 6 bits, and offset information is composed of 6 bits, but the present inventive concept is not restricted thereto.

The pattern information corresponds to a relative position relationship formed by at least one bad pixel. For example, when there is only one bad pixel, the pattern information is expressed as "000000"; when there are two bad pixels separated by one pixel in a horizontal direction, the pattern information is expressed as "000001"; and when there are two bad pixels separated by one pixel in a vertical direction, the pattern information is expressed as "000010". The offset information includes a horizontal offset and a vertical offset of each of bad pixels from a certain bad pixel.

In the first case CASE1 according to an embodiment of the present inventive concept, first data DATA1 including only the coordinates, (e.g., X- and Y-coordinates) of the representative pixel R2 may be stored as the representative pixel information RPI in the bad pixel memory 210. For example, the capacity of the bad pixel memory 210 required for processing of bad pixels B3 and B4 is 26 bits which corresponds to the coordinates of the representative pixel R2. This is because the bad pixel detection unit 220 according to an embodiment of the present inventive concept is able to detect a bad pixel based only the coordinates of the representative pixel R2.

In the second case CASE2 as a comparison example, second data DATA2 includes the coordinates, (e.g., X- and Y-coordinates) of the bad pixel B3 and the pattern information about the relative position relationship between the bad pixels B3 and B4. For example, the capacity of the bad pixel memory 210 required for processing of the bad pixels B3 and B4 is 32 bits which corresponds to the coordinates of the bad pixel B3 and the pattern information. This capacity is substantially 23% higher than that in the first case CASE1.

In the third case CASE3 as a comparison example, third data DATA3 includes the coordinates of the bad pixel B3 and the offset information about the horizontal offset (e.g., "000") and the vertical offset (e.g., "001") of the bad pixel B4 from the bad pixel B3. For example, the capacity of the bad pixel memory 210 required for processing of the bad pixels B3 and B4 is 32 bits which corresponds to the coordinates of the bad pixel B3 and the offset information. This capacity is substantially 23% higher than that in the first case CASE1.

In the fourth case CASE4 as a comparison example, fourth data DATA4 includes the coordinates of the bad pixel B3 and the coordinates of the bad pixel B4. For example, the capacity of the bad pixel memory 210 required for processing of the bad pixels B3 and B4 is 52 bits which corresponds to the coordinates of the bad pixel B3 and the coordinates of the bad pixel B4. This capacity is substantially 100% higher than that in the first case CASE1.

With the recent demand for the miniaturization of an image sensor, the degree of integration of a pixel array may be increased. Therefore, structures in which a plurality of pixels shares a transistor with each other may be used and bad pixels may be generated adjacent to each other. In addition, with the demand for the miniaturization of an image sensor or an application processor, the capacity of memory for bad pixel processing may be decreased.

Therefore, according to an embodiment of the present inventive concept, the image sensor 100 or the application processor 500 stores only the coordinates of a representative pixel representing adjacent bad pixels in memory and performs the bad pixel processing using the coordinates, and thus, the capacity of memory used for the bad pixel processing may be minimized. In addition, the image sensor 100 or the application processor 500 does not perform either bad pixel detection or bad pixel compensation on a kernel that does not include a representative pixel, and thus, an amount of computation and power consumption required for the bad pixel processing may be minimized.

Figure 8:
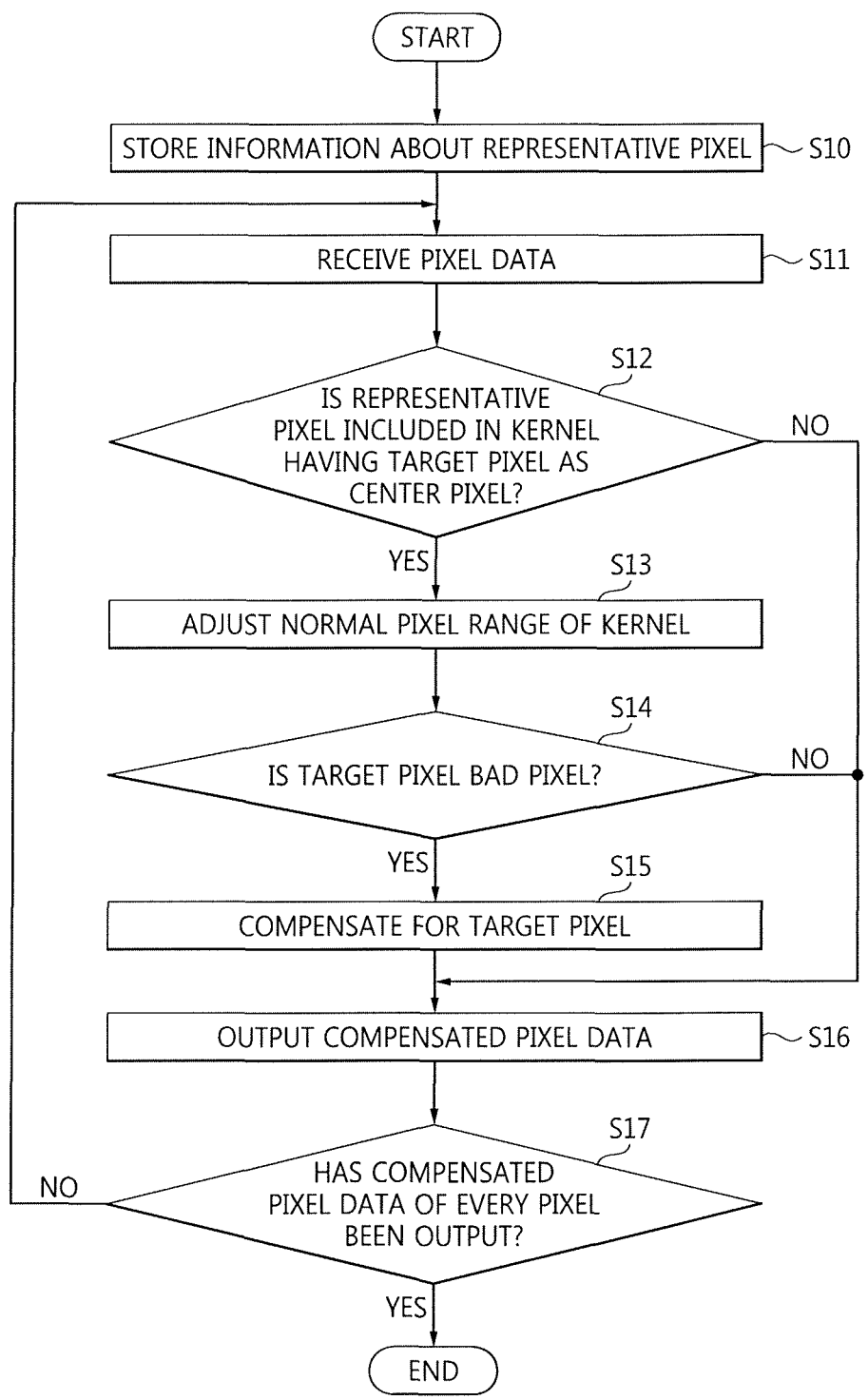
FIG. 8 is a flowchart of an operation of a bad pixel processing unit illustrated in FIG. 3 according to an embodiment of the present inventive concept.

FIG. 8 is a flowchart of an operation of a bad pixel processing unit 200 illustrated in FIG. 3 according to an embodiment of the present inventive concept. Referring to FIGS. 1 through 8, the sensor tester 600 may generate and store the representative pixel information RPI, which includes the coordinates of a representative pixel and information about the number of bad pixels adjacent to the representative pixel, in the bad pixel memory 210 in operation S10.

The bad pixel processing unit 200 may receive the pixel image PI from the image generating unit 105 of the image sensor 100 or the image sensor 565 in operation S11. The bad pixel detection unit 220 may determine whether the representative pixel is included in a kernel having a target pixel as a center pixel in operation S12. The bad pixel detection unit 220 may compare the coordinates of the target pixel with the coordinates of the representative pixel to calculate a horizontal offset and a vertical offset, and may determine whether the representative pixel is included in the kernel by determining whether the horizontal and vertical offsets are equal to or smaller than in absolute value than a predetermined value corresponding to a size of the kernel. For example, the predetermined value may be n/2 when the size of the kernel is n×n.

When the representative pixel is not included in the kernel (e.g., in case of NO) in operation S12, the bad pixel detection unit 220 may output the target pixel as the compensated pixel image CPI in operation S16. When the representative pixel is included in the kernel (e.g., in case of YES) in operation S12, the bad pixel detection unit 220 may determine and adjust a normal pixel range NPR of the kernel in operation S13. In an embodiment of the present inventive concept, when the number of bad pixels adjacent to the representative pixel is greater than a predetermined number (e.g., 2), the bad pixel detection unit 220 may determine and adjust the normal pixel range NPR of the kernel in operation S13. In an embodiment of the present inventive concept, the operation S13 may be omitted.

The bad pixel detection unit 220 may determine whether the target pixel is a bad pixel in operation S14. When the target pixel is not a bad pixel (e.g., in case of NO) in operation S14, the bad pixel detection unit 220 may output the target pixel as the compensated pixel image CPI in operation S16. When the target pixel is a bad pixel (e.g., in case of YES) in operation S14, the bad pixel compensation unit 230 may compensate for the target pixel using pixels included in the kernel in operation S15.

The bad pixel compensation unit 230 may output, as the compensated pixel image CPI, the target pixel that has been compensated for in operation S16. After the compensated pixel image CPI is output, the operation of the bad pixel processing unit 200 may be repeated until the bad pixel processing is completed for all pixels (e.g., pixels corresponding to a single frame). For example, the operation of the bad pixel processing unit 200 may be repeated when the bad pixel processing is not completed (e.g., in case of NO) in operation S17, and the operation of the bad pixel processing unit 200 may end when the bad pixel processing is completed for all pixels (e.g., in case of YES) in operation S17.

In addition, the present inventive concept can be embodied as computer readable codes on a computer readable recording medium. The computer readable recording medium is any data storage device that can store data which can be thereafter read by a computer system. For example, the computer readable recording medium includes ROM, RAM, CD-ROMs, magnetic tapes, floppy disks, optical data storage devices, or the like. In addition, the computer readable recording medium can be distributed over network coupled computer systems so that the computer readable codes are stored and executed in a distributed fashion. Also, functional programs, codes, and code segments for accomplishing the present inventive concept can be easily understood and derived by a person skilled in the art to which the present inventive concept pertains.

As described above, according to an embodiment of the present inventive concept, only the coordinates of a representative pixel which represents adjacent bad pixels are stored in memory and bad pixel processing is performed using the coordinates, so that memory capacity used for the bad pixel processing is minimized. In addition, when the representative pixel is not included in a kernel, bad pixel detection and bad pixel compensation is not performed on the kernel, so that an amount of computation and power consumption required for the bad pixel processing are minimized.

While the present inventive concept has been particularly shown and described with reference to exemplary embodiments thereof, it will be understood that various changes in forms and details may be made therein without departing from the spirit and scope of the present inventive concept as defined by the following claims.

What is claimed is:

1. An image sensor comprising:
an image generating unit configured to generate a pixel image corresponding to intensity of incident light; and
a bad pixel processing circuit configured to detect a bad pixel, and to output a compensated pixel image,
wherein the bad pixel processing circuit comprises:
a bad pixel detection unit configured to determine whether a representative pixel representing at least one bad pixel is included in a kernel, the kernel having a first pixel at a center of the kernel, and to determine whether the first pixel is a bad pixel when the representative pixel is included in the kernel; and
a bad pixel compensation unit configured to compensate for the first pixel using a second pixel in the kernel when the first pixel is determined to be a bad pixel, and to output the compensated pixel image,
wherein first data including only coordinates of the representative pixel are stored as representative pixel information in a bad pixel memory and the bad pixel detection unit determines whether the first pixel is a bad pixel using the coordinates.

2. The image sensor of claim 1, wherein the bad pixel detection unit adjusts a first pixel range of the kernel when the representative pixel is included in the kernel.

3. The image sensor of claim 1, wherein the bad pixel detection unit compares coordinates of the first pixel with the coordinates of the representative pixel, calculates a horizontal offset and a vertical offset based on the comparison result, and determines whether the horizontal offset and the vertical offset are within a predetermined value corresponding to a size of the kernel,
wherein the horizontal offset is a distance in a first direction between the first pixel and the representative pixel, and
wherein the vertical offset is a distance in a second direction perpendicular to the first direction between the first pixel and the representative pixel.

4. The image sensor of claim 1, wherein a size of the kernel is one of 3×3, 5×5 and 7×7.

5. The image sensor of claim 1, wherein the bad pixel detection unit outputs the first pixel as the compensated pixel image without performing the bad pixel compensation when the representative pixel is not included in the kernel.

6. The image sensor of claim 1, wherein the image generating unit comprises:
a pixel array comprising a plurality of pixels each configured to generate an electrical signal varying depending on the intensity of the incident light;
a readout block configured to convert the electrical signal into the pixel image in a digital format; and
a control unit configured to control the pixel array and the readout block.

7. An application processor comprising:
a camera interface configured to receive a pixel image; and
an image signal processor configured to process the pixel image to generate image data,
wherein the image signal processor comprises:
a bad pixel detection unit configured to determine whether a representative pixel representing at least one bad pixel is included in a kernel, the kernel having a first pixel at a center of the kernel, and to determine whether the first pixel is a bad pixel when the representative pixel is included in the kernel; and a bad pixel compensation unit configured to compensate for the first pixel using a second pixel in the kernel when the first pixel is determined to be a bad pixel, wherein first data including only coordinates of the representative pixel are stored as representative pixel information in a bad pixel memory.

8. The application processor of claim 7, wherein the bad pixel detection unit adjusts a first pixel range of the kernel when the representative pixel is included in the kernel.

9. The application processor of claim 7, wherein the bad pixel detection unit compares coordinates of the first pixel with the coordinates of the representative pixel, calculates a horizontal offset and a vertical offset based on the comparison result, and determines whether the horizontal offset and the vertical offset are within a predetermined value corresponding to a size of the kernel, wherein the horizontal offset is a distance in a first direction between the first pixel and the representative pixel, and wherein the vertical offset is a distance in a second direction perpendicular to the first direction between the first pixel and the representative pixel.

10. The application processor of claim 7, wherein a size of the kernel is one of 3×3, 5×5 and 7×7.

11. The application processor of claim 7, wherein the bad pixel detection unit outputs the first pixel as a compensated pixel image without performing the bad pixel compensation when the representative pixel is not included in the kernel.

12. A method of processing a bad pixel included in a pixel image, the method comprising:

detecting a bad pixel using coordinates of a representative pixel representing at least one bad pixel, wherein only the coordinates of the representative pixel are stored as representative pixel information in a non-volatile memory; and compensating for a first pixel using a second pixel in a kernel when the first pixel is a bad pixel, the kernel having the first pixel at a center of the kernel, wherein the detecting a bad pixel comprises:

determining whether the representative pixel is included in the kernel;

determining whether the first pixel is a bad pixel when the representative pixel is included in the kernel; and determining the first pixel as a bad pixel when a luminance value of the first pixel is not within a first pixel range, wherein the first pixel range is determined based on an average luminance of the kernel.

13. The method of claim 12, wherein the detecting the bad pixel further comprises decreasing the first pixel range of the kernel when the representative pixel is included in the kernel.

14. The method of claim 12, wherein the detecting the bad pixel further comprises outputting the first pixel as a compensated pixel image when the representative pixel is not included in the kernel.

15. The method of claim 12, wherein the detecting the bad pixel further comprises outputting the first pixel as a compensated pixel image when the luminance value of the first pixel is within the first pixel range in the kernel.

16. The method of claim 12, wherein the second pixel surrounds the first pixel in the kernel and has a substantially same color as the first pixel.

* * * * *